US011996609B2

(12) United States Patent
Wang

(10) Patent No.: US 11,996,609 B2
(45) **Date of Patent: *May 28, 2024**

(54) 5G ULTRA-WIDEBAND MONOPOLE ANTENNA

(71) Applicant: Airgain, Inc., San Diego, CA (US)

(72) Inventor: Daniel Wang, Sydney (AU)

(73) Assignee: Airgain, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,003

(22) Filed: May 12, 2023

(65) Prior Publication Data

US 2023/0282964 A1 Sep. 7, 2023

Related U.S. Application Data

(63) Continuation of application No. 17/359,788, filed on Jun. 28, 2021, now Pat. No. 11,652,279.

(60) Provisional application No. 63/048,044, filed on Jul. 3, 2020.

(51) Int. Cl.

| | |
|---|---|
| ***H01Q 1/24*** | (2006.01) |
| ***H01Q 1/38*** | (2006.01) |
| ***H01Q 5/307*** | (2015.01) |
| ***H01Q 9/40*** | (2006.01) |
| *H01Q 1/00* | (2006.01) |

(52) U.S. Cl.

CPC ............... *H01Q 1/246* (2013.01); *H01Q 1/38* (2013.01); *H01Q 5/307* (2015.01); *H01Q 9/40* (2013.01); *H01Q 1/007* (2013.01)

(58) Field of Classification Search

CPC .......... H01Q 1/246; H01Q 1/38; H01Q 5/307; H01Q 9/40; H01Q 1/007; H01Q 5/25; H01Q 9/42

See application file for complete search history.

(56) References Cited

U.S. PATENT DOCUMENTS

| | | | | |
|---|---|---|---|---|
| 11,652,279 | B2 * | 5/2023 | Wang | H01Q 9/40 343/843 |
| 2014/0118196 | A1 * | 5/2014 | Koskiniemi | H01Q 21/205 343/702 |
| 2020/0313302 | A1 * | 10/2020 | Ma | H01Q 9/40 |
| 2021/0050654 | A1 * | 2/2021 | Bane | H01Q 1/48 |

* cited by examiner

*Primary Examiner* — David E Lotter

(74) *Attorney, Agent, or Firm* — Clause Eight; Michael Catania

(57) ABSTRACT

An ultra-wideband monopole antenna for 5G application is disclosed comprising a first quarter wavelength conductor and a second quarter wavelength conductor, for transmitting and/or receiving electromagnetic waves. A flat portion of the first quarter wavelength conductor and a flat portion of the second quarter wavelength conductor are preferably arranged and located perpendicular and intersecting to each other. Two curved wings of the first quarter wavelength conductor and two curved wings of the second quarter wavelength conductor are preferably arranged and located concentrically and having a same center. The first and second quarter wavelength conductors are joined to deliver ultra wideband frequency in the range of 600-960 MHz and 1710-6000 MHz.

11 Claims, 8 Drawing Sheets

5G ULTRA-WIDEBAND MONOPOLE ANTENNA

CROSS REFERENCES TO RELATED APPLICATIONS

The Present Application is a continuation application of U.S. patent application Ser. No. 17/359,788, filed on Jun. 28, 2021, which claims priority to U.S. Patent Application No. 63/048,044 filed on Jul. 3, 2020, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to an ultra-wideband monopole antenna for an indoor 5G fixed wireless, small cell or indoor coverage application.

Description of the Related Art

For indoor 5G fixed wireless, small cell and indoor coverage system, there is a need to have a multi band monopole antenna with an extremely low and slim profile.

For an ultra-wideband monopole antenna to cover the full 5G band, 600-6000 MHz, the challenge that arises is that the required operating frequency bandwidth is very wide compared with that of a conventional monopole antenna used in telecommunication system. Therefore it is very challenging to design a monopole antenna in an extremely low and slim profile to deliver flat and linear gain figure and a high radiation efficiency in the whole operating frequency bandwidth.

BRIEF SUMMARY OF THE INVENTION

The present invention preferably provides an antenna assembly for an ultra-wideband monopole antenna with two quarter wavelength conductors that are uniquely arranged electrically and physically in an extremely low and slim profile.

The present invention is an ultra-wideband monopole antenna for an indoor 5G fixed wireless, small cell or indoor coverage application where both attractive form factor and aesthetical appearance are required.

In particular, an ultra-wideband antenna is designed for a flat and linear gain figure and an high radiation efficiency with an extremely low and slim profile.

The achievement of an ultra wideband monopole antenna described herein is through the unique arrangement of two quarter wavelength conductors.

One aspect of the present invention is an ultra-wideband monopole antenna assembly having an extremely low and slim profile. The antenna assembly comprises a first quarter wavelength conductor comprising a first flat portion, and a second quarter wavelength conductor comprising a second flat portion. Each of the first quarter wavelength conductor and the second quarter wavelength conductor is configured to transmit and/or receive an electromagnetic signal. The antenna assembly operates on a 5G band. The flat portion of the first quarter wavelength conductor and the flat portion of the second quarter wavelength conductor are arranged and located perpendicular and intersect each other.

Another aspect of the present invention is an ultra-wideband monopole antenna comprising a base, a first quarter wavelength conductor comprising a first flat portion and two identical curved wings, and a second quarter wavelength conductor comprising a second flat portion and two identical curved wings. The first quarter wavelength conductor and the second quarter wavelength conductor preferably delivers 600-960 MHz and 1710-6000 MHz operating frequency bandwidth.

The antenna assembly is preferably a ground plane dependent antenna. The two identical curved wings of the first quarter wavelength conductor and two identical curved wings of the second quarter wavelength conductor are preferably arranged and located concentrically and have a same center. A pre-determined height of the first quarter wavelength conductor, together with two identical curved wings, preferably deliver a first operating frequency bandwidth with restricted height. The pre-determined radius of the two identical curved wings of the first quarter wavelength conductor, together with the two identical curved wings of the second quarter wavelength conductor, preferably deliver a first and a second operating frequency bandwidth as required with restricted diameter. A pre-determined height of the flat portion from both the first and second quarter wavelength conductors plus the lengths of two identical curved wings from the first and second quarter wavelength conductor, preferably contribute to a flat and linear gain figure across an ultra-wideband 5G frequency band. A shape and location of the identical curved wings from the first and second quarter wavelength conductors, preferably contribute to a high radiation efficiency with extremely low and slim profile.

A flat portion of the first and second quarter wavelength conductors is preferably made from FR4 PCB and the identical curved wings are preferably made from stainless steel.

The antenna assembly preferably further comprises a coaxial connector with a center conductor connected onto the joined flat portions from both the first and second wavelength conductors.

A shape and dimension of the identical curved wings from both the first and second quarter wavelength conductors are alternatively not identical. The curved wings are preferably not limited to having the same radius or distance from the center. The curved wings are preferably not limited to curving shape as long as this monopole antenna is within the restricted radius. The two identical curved wings from the first quarter wavelength conductor are preferably not limited to having the same height when connected onto the flat portion of the first quarter wavelength conductor as long as the monopole antenna is within the restricted height. The two identical curved wings from the second quarter wavelength conductor are preferably not limited to having the same height when connected onto the flat portion of the second quarter wavelength conductor.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
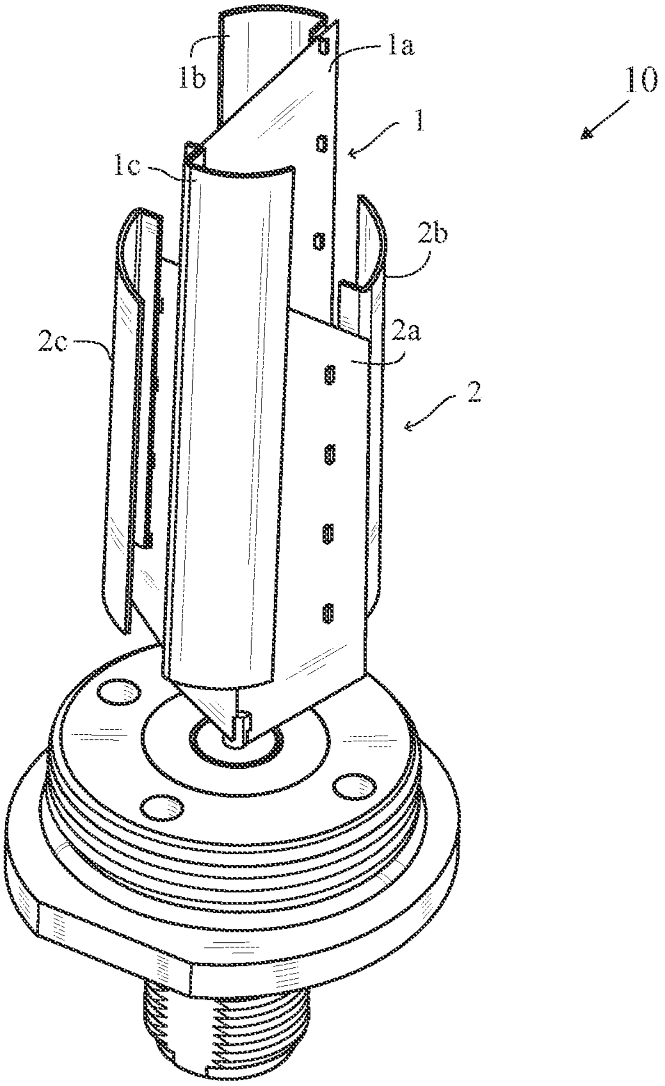
FIG. 1 is a perspective view of an ultra wideband monopole antenna.

As shown in FIG. 1, an ultra wideband monopole antenna 10 comprises a first quarter wavelength conductor 1 configured for a first operating frequency and a second quarter wavelength conductor 2 configured for a second operating frequency.

In a preferred embodiment having a unique arrangement of two quarter wavelength conductors 1 and 2 as shown in FIG. 1, each quarter wavelength conductor 1 and 2 comprises a flat portion 1*a* and 2*a* edged with two identical curved wings 1*b*, 1*c*, 2*b* and 2*c*. The flat portion 1*a* of the first quarter wavelength conductor 1 and the flat portion 2*a* of the second quarter wavelength conductor 2 are preferably arranged and located perpendicular and intersecting to each other.

In a two curved wings embodiment, there are two identical wings, with an equal radius or distance to the center, which are connected on two edges of the flat portion of each quarter wavelength conductor, thereby widening the matching bandwidth of the first and second operating frequency to provide a bandwidth of 617-960 MHz and 1710-6000 MHz.

In a flat and curved portion from the quarter wavelength conductor embodiment of an ultra wideband monopole antenna 10, the two identical curved wings 1*b* and 1*c* of the first quarter wavelength conductor 1 and the two identical curved wings 2*b* and 2*c* of the second quarter wavelength conductor 2 are preferably arranged and located concentrically and have a same center.

In a restricted height embodiment, a pre-determined height of the first quarter wavelength conductor, together with two identical curved wings, deliver a first operating frequency bandwidth as required for a 5G application. The pre-determined height preferably ranges from 70 to 90 millimeters ("mm"), and is most preferably 78 mm, which provides 617-960 MHz of the 5G operating band.

In a restricted radius embodiment, a pre-determined radius of two identical curved wings of the first quarter wavelength conductor, together with two identical curved wings of the second quarter wavelength conductor, deliver a first and second operating frequency bandwidth as required for a 5G application. The pre-determined radius of two identical curved wings of the first quarter wavelength conductor preferably ranges from 10 mm to 15 mm and is most preferably 13.5 mm, which contributes to the lower band, 617-960 MHz, and the pre-determined radius of the two identical curved wings of the second quarter wavelength conductor preferably ranges from 10 mm to 15 mm and is most preferably 12.3 mm, which contributes to the upper band, 1710-6000 MHz.

In an ultra wideband matching bandwidth embodiment, the first and second quarter wavelength conductors 1 and 2 are joined to deliver ultra wideband frequency in the 5G frequency bands.

In a flat and linear gain embodiment, a pre-determined height of a flat portion 1*a* and 2*a* from both first and second quarter wavelength conductors 1 and 2, plus the lengths of two identical curved wings 1*b*, 1*c*, 2*b* and 2*c* from the first and second quarter wavelength conductors 1 and 2, contribute to the flat and linear gain across the ultra-wideband frequency band. The pre-determined length of the two identical curved wings 1*b* and 1*c* from the first quarter wavelength conductor 1 preferably ranges from 12 mm to 20 mm, and is most preferably 16.5 mm, which contributes 3 to 4 dBi flat and linear gain at the lower band, 617-960 MHz, of 5G operating band.

In a high radiation efficiency embodiment, a shape and location of the two identical curved wings 1*b*, 1*c*, 2*b* and 2*c* from the first and second quarter wavelength conductors 1 and 2 contribute to a high radiation efficiency with the extremely low and slim profile of the ultra wideband monopole antenna 10. Each quarter wavelength conductor 1 and 2 comprises a flat portion 1*a* and 1*b* edged with two identical curved wings 1*b* and 1*c*, 2*b* and 2*c*. The flat portion 1*a* of the first quarter wavelength conductor 1 and the flat portion 2*a* of the second quarter wavelength conductor 2 are preferably arranged and located perpendicular and intersecting to each other. The two identical wings 1*b* and 1*c*, 2*b* and 2*c* are connected onto two edges of the flat portion 1*a* and 2*a* of each quarter wavelength conductor 1 and 2, widening the matching bandwidth of the first and second operating frequency. Preferably, the identical curved wings 1*b* and 1*c* of the first quarter wavelength conductor 1 and identical curved wings 2*b* and 2*c* of the second quarter wavelength conductor 2 are preferably arranged and located concentrically and having the same center. With such arrangement as described above, this invention not only provides a low and slim profile, but also provides more than 80% average radiation efficiency.

In a cost effective design, the antenna 10 has a flat portion 1*a* and 1*b* from the first and second quarter wavelength conductors 1 and 2 made from FR4 PCB and the curved wings 1*b*, 1*c*, 2*b* and 2*c* composed of a stainless steel. This cost effective design makes the ultra wideband monopole antenna 10 very cost effective, competitive and easy to be built.

In other version, the ultra wideband monopole antenna 10 uses materials such as aluminum, brass, metal alloy, ceramic, FPC, LDS (Laser Direct Structuring) and PDS (Printing Direct Structuring).

A frequency embodiment is a multiband antenna or an ultra-wide band antenna 10 with a frequency at 600-960 MHz and 1710-6000 MHz.

In another version, the ultra wideband monopole antenna 10 also operates at 136-174 MHz and 380-520 MHz (a lower band version of the monopole antenna at 136-174 and 380-520 MHz is popular with public safety application for the military, police and/or security force) at the lower band, and 7 GHz and beyond at the upper band, or even further at 28 GHz band. Scaling is a preferred method to apply a reference antenna design to different band antenna application.

An object of present invention is to provide an ultra-wideband monopole antenna 10 with a unique arrangement of two quarter wavelength conductors 1 and 2, both having a shape combined from a flat portion 1a and 2a, and curved wings 1b, 1c, 2b and 2c.

FIG. 1 illustrates the ultra-wideband monopole antenna 10 with an arrangement of the first quarter wavelength conductor 1 and second quarter wavelength conductor 2, to provide a 600-960 MHz and 1710-6000 MHz operating frequency bandwidth.

Figure 2:
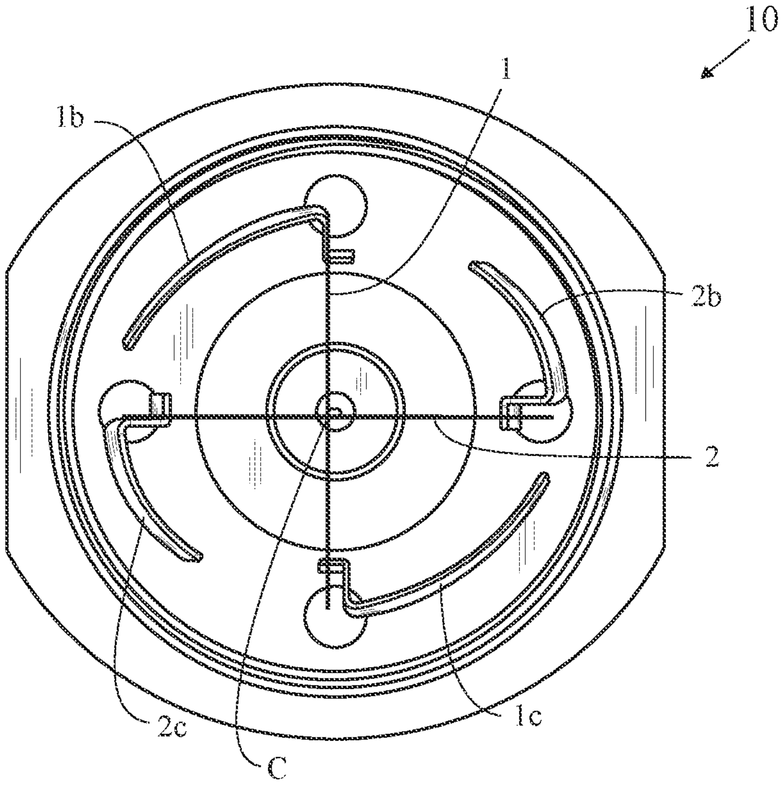
FIG. 2 is a top plan view of an ultra wideband monopole antenna.

FIG. 2 illustrates a top plan view of the ultra-wideband monopole antenna with two identical curved wings 1b and 1c, 2b and 2c extended from a flat portion 1a and 2a of each quarter wavelength conductor 1 and 2. The two identical curved wings 1b and 1c have an equal radius or distance to the center, as do the identical curved wings 2b and 2c. The height of the two identical curved wings 1b and 1c of the first quarter wavelength conductor 1 preferably ranges from 70 mm to 85 mm, and is most preferably 78 mm. The length of the two identical curved wings 1b and 1c of the first quarter wavelength conductor 1 preferably ranges from 55 mm to 65 mm, and is most preferably 60.4 mm. The width (or precisely arc length) of the two identical curved wings 1b and 1c of the first quarter wavelength conductor preferably ranges from 12 mm to 20 mm, and is most preferably 16.5 mm. The thickness of the two identical curved wings 1b and 1c of the first quarter wavelength conductor 1 preferably ranges from 0.2 mm to 0.6 mm, and is most preferably 0.4 mm. The height of the two identical curved wings 2b and 2c of the second quarter wavelength conductor 2 preferably ranges from 50 mm to 65 mm, and is most preferably 58.3 mm. The length of the two identical curved wings 2b and 2c of the second quarter wavelength conductor 2 preferably ranges from 35 mm to 45 mm, and is most preferably 39.2 mm. The width (or precisely arc length) of the two identical curved wings 2b and 2c of the second quarter wavelength conductor 2 preferably ranges from 7 mm to 15 mm, and is most preferably 11 mm. The thickness of the two identical curved wings 2b and 2c of the second quarter wavelength conductor 2 preferably ranges from 0.2 mm to 0.6 mm, and is most preferably 0.4 mm.

This ultra-wideband monopole antenna 10 may also comprises additional features necessary for the functionality of a monopole antenna, for example, a ground plane, a coaxial connector or the like, which are not fully described or demonstrated in the following and not shown in the figures.

Each quarter wavelength conductor 1 and 2 preferably comprises a flat portion edged with two identical curved wings 1b and 1c, 2b and 2c. The flat portion 1a of the first quarter wavelength conductor 1 and the flat portion 2a of the second quarter wavelength conductor 2 are preferably arranged and located perpendicular and intersecting to each other.

There are two identical wings 1b and 1c, 2b and 2c are connected onto two edges of the flat portion 1a and 2a of each quarter wavelength conductor 1 and 2, widening the matching bandwidth of the first and second operating frequency.

Preferably, the identical curved wings 1b and 1c of the first quarter wavelength conductor 1 and identical curved wings 2b and 2c of the second quarter wavelength conductor 2 are arranged and located concentrically and have a same center.

As the ultra-wideband monopole antenna preferably has an attractive form factor and aesthetical appearance with an extremely low and slim profile, both the height and the radius have been designed such to match a restricted target. The target height is preferably less than 80 mm and the target radius is preferably less than 15 mm.

The pre-determined height of the first quarter wavelength conductor 1, together with two identical curved wings 1b and 1c, deliver the first operating frequency bandwidth as required for a 5G application.

Also, the pre-determined diameter of two identical curved wings 1b and 1c of the first quarter wavelength conductor 1, together with the two identical curved wings 2b and 2c of the second quarter wavelength conductor 2, deliver the first and second operating frequency bandwidth as required for a 5G application.

Figure 3:
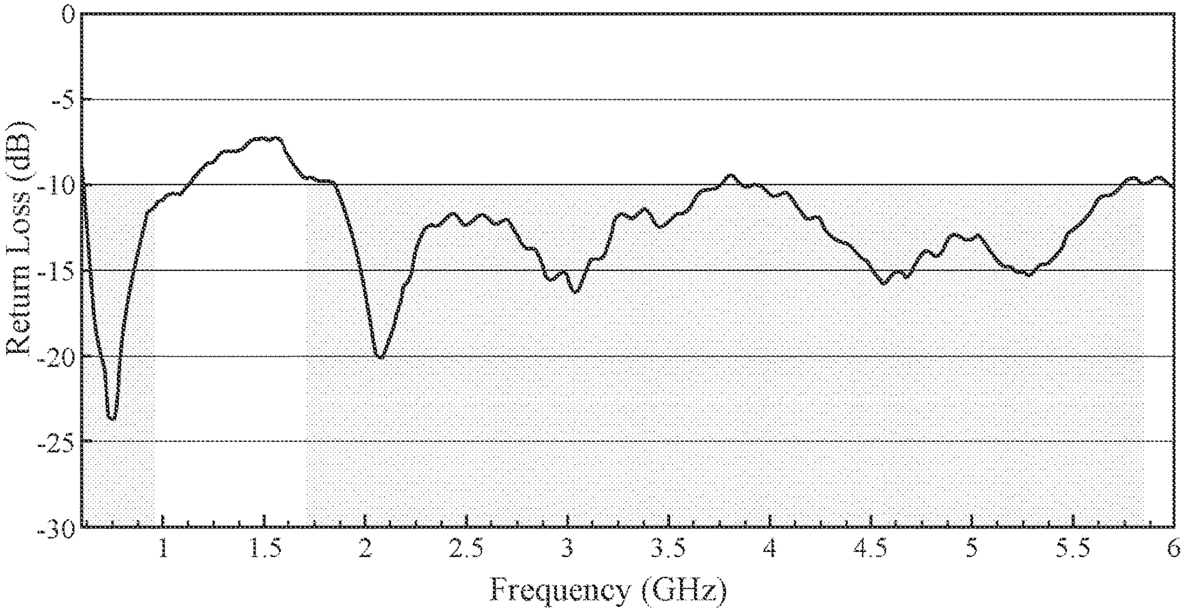
FIG. 3 is a graph illustrating a return loss of the ultra wideband monopole antenna.

FIG. 3 illustrates a return loss of the unique antenna design.

This unique monopole antenna is arranged such that it not only delivers ultra wideband frequency band, but also generates a flat and linear gain figure plus a high radiation efficiency.

Figure 4:
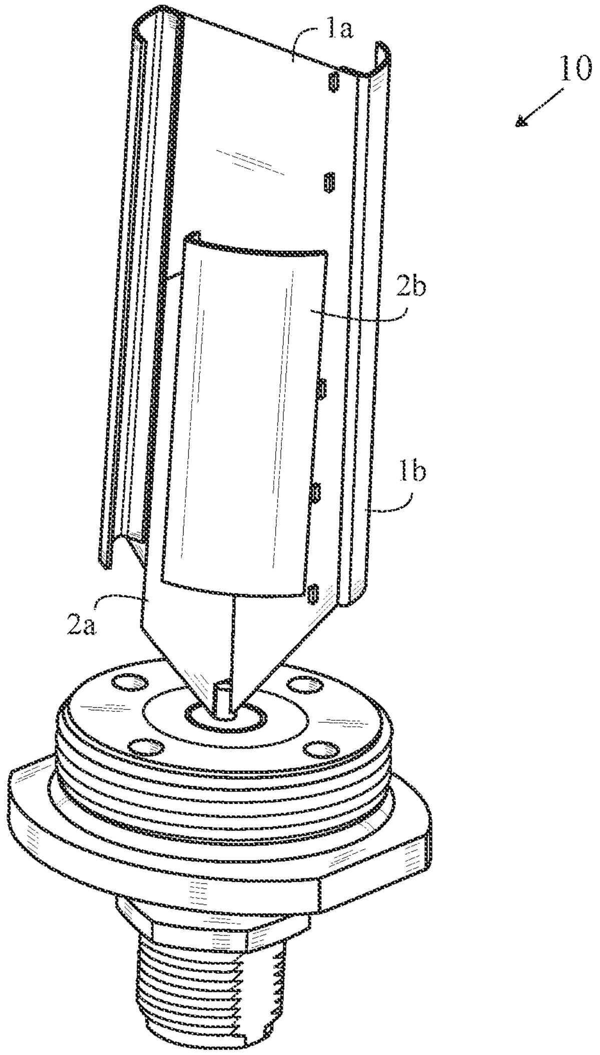
FIG. 4 is a perspective view of the details of the flat and curved portions from the first and second quarter wavelength conductors of the ultra wideband monopole antenna.

FIG. 4 illustrates a pre-determined height of flat portions 1a and 2a from both the first and second quarter wavelength conductors 1 and 2 plus the lengths of the curved wings 1b and 1c, 2b and 2c from the first and second quarter wavelength conductors 1 and 2, which contribute to the flat and linear gain across the ultra-wideband frequency band.

Figure 5:
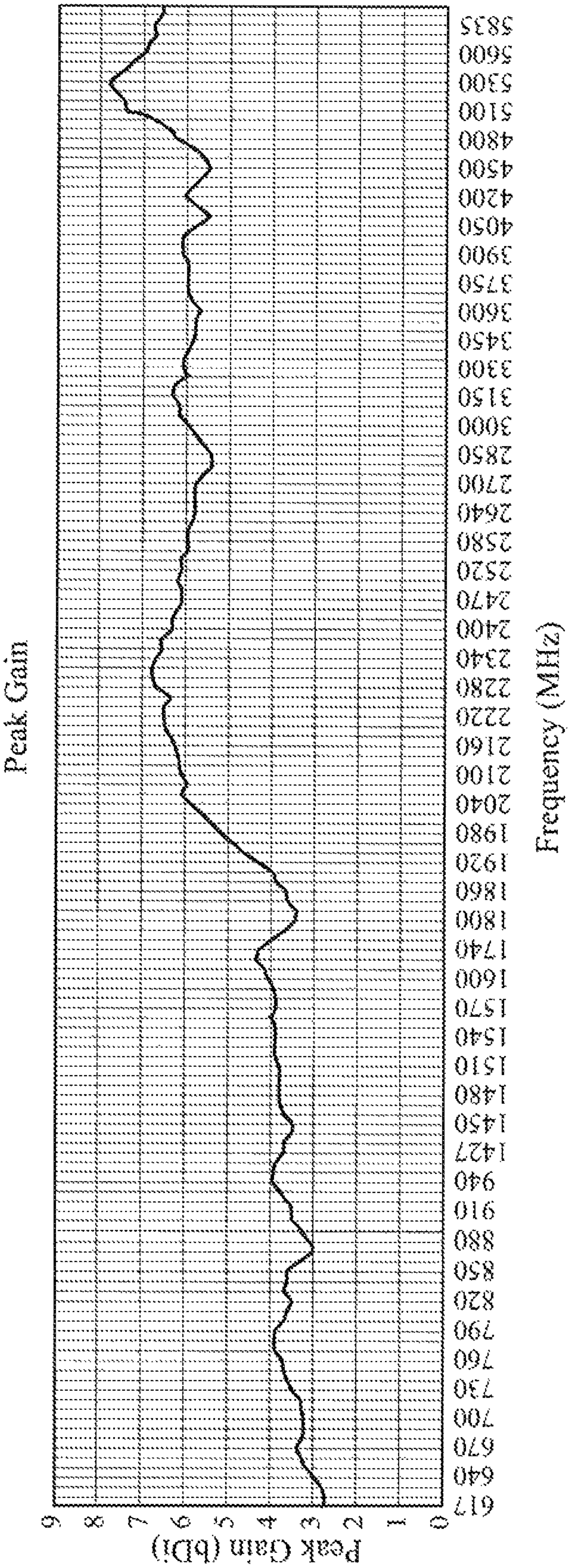
FIG. 5 is a graph illustrating a peak gain of the ultra wideband monopole antenna across the whole operating frequency band.

FIG. 5 illustrates a peak gain of this monopole antenna in a flat and linear gain figure across the whole operating frequency band.

Figure 6:
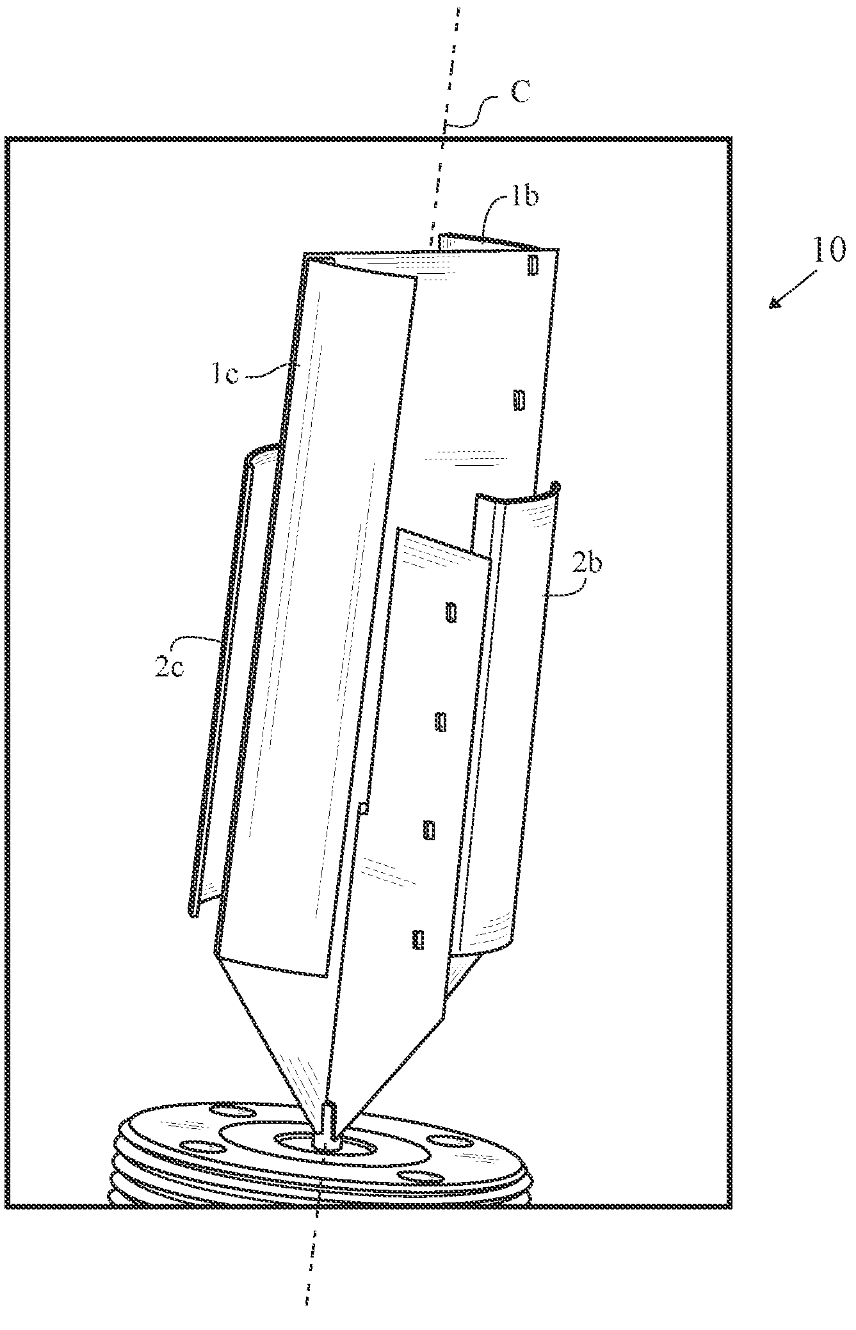
FIG. 6 is a perspective view of identical curved wings from the first and second quarter wavelength conductors of the ultra wideband monopole antenna.

FIG. 6 illustrates a shape and location of the identical curved wings from the first and second quarter wavelength conductors, which contribute to a high radiation efficiency with an extremely low and slim profile.

Figure 7:
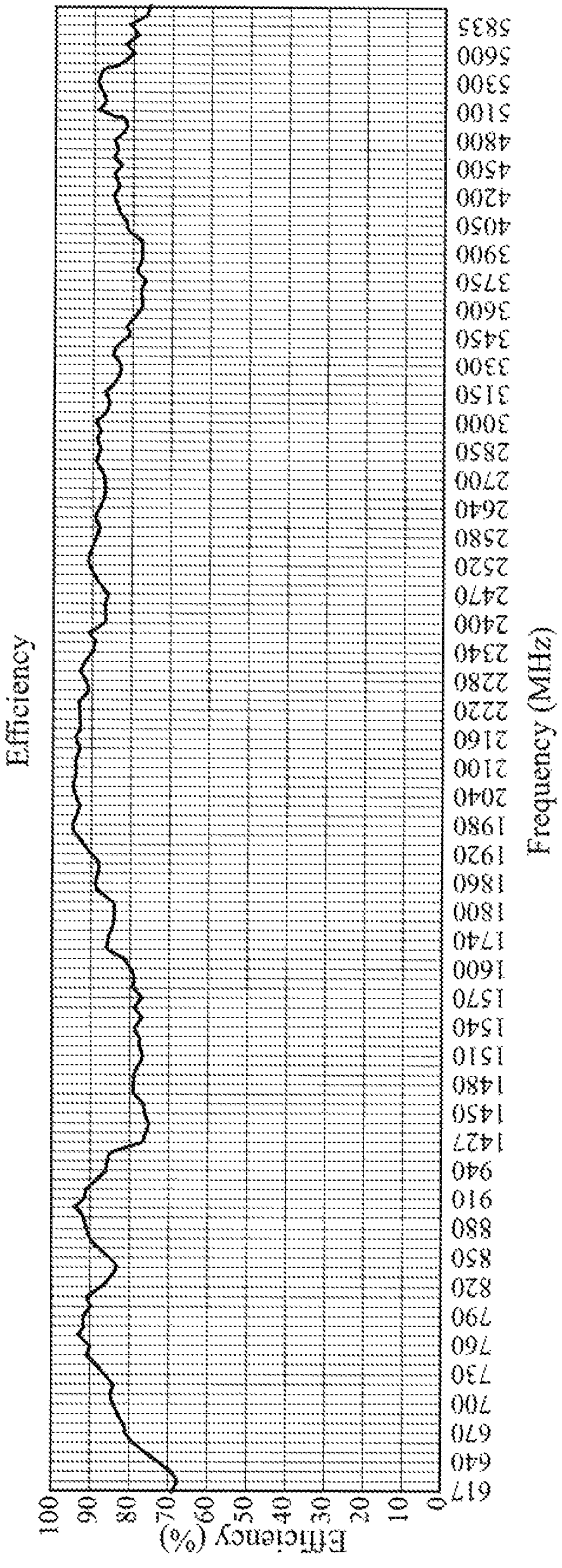
FIG. 7 is a graph illustrating a radiation efficiency of the ultra wideband monopole antenna.

FIG. 7 illustrates a high radiation efficiency of the ultra wideband monopole antenna 10.

In a cost effective design of the ultra wideband monopole antenna, the ultra wideband monopole antenna also preferably comprises a FR4 PCB as the flat portions 1a and 2a from the first and second quarter wavelength conductors 1 and 2.

The flat portions 1a and 2a, from both the first and second quarter wavelength conductors, are preferably printed on one side of a FR4 PCB 11 and 22 respectively, wherein two printed PCB patterns 1a and 2a are soldered together perpendicular and intersecting to each other.

Figure 8:
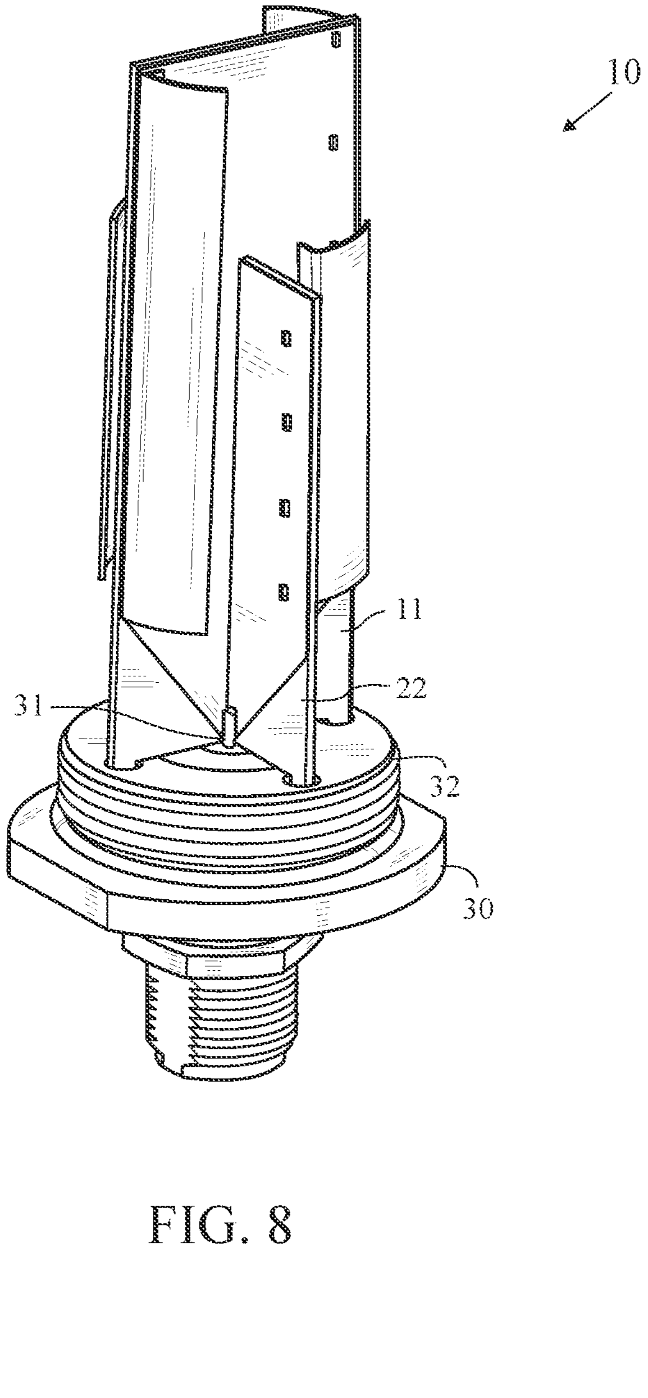
FIG. 8 is a perspective view of the physical structure of the first and second quarter wavelength conductors of the ultra wideband monopole antenna.

The ultra wideband monopole antenna also preferably comprises a feeding network, such as in a form of coaxial connector 30. The connector 30 preferably comprises a signal feeding portion 31 and a grounding portion 32. As best seen in FIG. 8, the joined patterns of 1a and 2a are further soldered onto the feeding portion 31, as well as the center conductor of the coaxial connector 30.

Advantageously, the substrate material of the FR4 PCB provides the mechanical support for the first and second quarter wavelength conductors to be settled down to the body 32 of connector 30. This makes the ultra wideband monopole antenna very cost effective, competitive and easy to be built.

He, U.S. Pat. No. 9,362,621 for a Multi-Band LTE Antenna is hereby incorporated by reference in its entirety.

Abramov et al., U.S. Pat. No. 7,215,296 for a Switch Multi-Beam Antenna Serial is hereby incorporated by reference in its entirety.

Salo et al., U.S. Pat. No. 7,907,971 for an Optimized Directional Antenna System is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 8,423,084 for a Method for radio communication in a wireless local area network and transceiving device is hereby incorporated by reference in its entirety.

Khitrik et al., U.S. Pat. No. 7,336,959 for an Information transmission method for a wireless local network is hereby incorporated by reference in its entirety.

Khitrik et al., U.S. Pat. No. 7,043,252 for an Information transmission method for a wireless local network is hereby incorporated by reference in its entirety.

Abramov et al., U.S. Pat. No. 8,184,601 for a METHOD FOR RADIO COMMUNICATION IN A WIRELESS LOCAL AREA NETWORK WIRELESS LOCAL AREA NETWORK AND TRANSCEIVING DEVICE is hereby incorporated by reference in its entirety.

Abramov et al., U.S. Pat. No. 7,627,300 for a Dynamically optimized smart antenna system is hereby incorporated by reference in its entirety.

Abramov et al., U.S. Pat. No. 6,486,832 for a Direction-agile antenna system for wireless communications is hereby incorporated by reference in its entirety.

Yang, U.S. Pat. No. 8,081,123 for a COMPACT MULTI-LEVEL ANTENNA WITH PHASE SHIFT is hereby incorporated by reference in its entirety.

Nagaev et al., U.S. Pat. No. 7,292,201 for a Directional antenna system with multi-use elements is hereby incorporated by reference in its entirety.

Abramov et al., U.S. Pat. No. 7,696,948 for a Configurable directional antenna is hereby incorporated by reference in its entirety.

Abramov et al., U.S. Pat. No. 7,965,242 for a Dual-band antenna is hereby incorporated by reference in its entirety.

Abramov et al., U.S. Pat. No. 7,729,662 for a Radio communication method in a wireless local network is hereby incorporated by reference in its entirety.

Abramov et al., U.S. Pat. No. 8,248,970 for an OPTIMIZED DIRECTIONAL MIMO ANTENNA SYSTEM is hereby incorporated by reference in its entirety.

Visuri et al., U.S. Pat. No. 8,175,036 for a MULTIMEDIA WIRELESS DISTRIBUTION SYSTEMS AND METHODS is hereby incorporated by reference in its entirety.

Yang, U.S. Patent Publication Number 20110235755 for an MIMO Radio System With Antenna Signal Combiner is hereby incorporated by reference in its entirety.

Yang et al., U.S. Pat. No. 9,013,355 for an L SHAPED FEED AS PART OF A MATCHING NETWORK FOR A MICROSTRIP ANTENNA is hereby incorporated by reference in its entirety.

Thill, U.S. patent Ser. No. 10/109,918 for a Multi-Element Antenna For Multiple bands Of Operation And Method Therefor, which is hereby incorporated by reference in its entirety.

Iellici, U.S. patent Ser. No. 10/305,182 for a Balanced Antenna is hereby incorporated by reference in its entirety.

He et al., U.S. patent Ser. No. 10/164,324 for Antenna Placement Topologies For Wireless Network System Throughputs Improvement is hereby incorporated by reference in its entirety.

Yang, U.S. Pat. No. 9,912,043 for an Antenna System For A Large Appliance is hereby incorporated by reference in its entirety.

Thill et al., U.S. Pat. No. 8,669,903 for a Dual Frequency Band Communication Antenna Assembly Having AN Inverted F Radiating Element is hereby incorporated by reference in its entirety.

Thill et al., U.S. Pat. No. 6,850,191 for a Dual Frequency Band Communication Antenna is hereby incorporated by reference in its entirety.

Thill et al., U.S. Pat. No. 6,087,990 for a Dual Function Communication Antenna is hereby incorporated by reference in its entirety.

Thill, U.S. patent Ser. No. 10/511,086 for an Antenna Assembly For A Vehicle is hereby incorporated by reference in its entirety.

He et al., U.S. patent application Ser. No. 16/379,767, filed on Apr. 9, 2019, for a 5G Broadband Antenna is hereby incorporated by reference in its entirety.

Montgomery, U.S. patent application Ser. No. 16/729,233, filed on Dec. 27, 2019, for a Dual Band Horizontally Polarized Omnidirectional Antenna, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. An ultra-wideband monopole antenna assembly having a low and slim profile, the antenna assembly comprising:

a first quarter wavelength conductor comprising a first flat portion and two curved wings arranged;

a second quarter wavelength conductor comprising a second flat portion and two curved wings;

wherein each of the first quarter wavelength conductor and the second quarter wavelength conductor is configured to transmit and/or receive an electromagnetic signal;

wherein the antenna assembly operates on a 5G band;

wherein the flat portion of the first quarter wavelength conductor and the flat portion of the second quarter wavelength conductor are arranged and located perpendicular and intersect each other;

wherein the two curved wings of the first quarter wavelength conductor and the two curved wings of the second quarter wavelength conductor are arranged and located concentrically and have a same center;

wherein a shape and dimension of the two curved wings of the first quarter wavelength conductor are different than a shape and dimension of the two curved wings of the second quarter wavelength conductor.

2. The antenna assembly of claim 1 wherein the antenna assembly is a ground plane dependent antenna.

3. The antenna assembly of claim 1 wherein a height of the first quarter wavelength conductor and the two curved wings ranges from 70 to 90 millimeters (mm).

4. The antenna assembly of claim 1 wherein a radius of the two curved wings of the first quarter wavelength conductor ranges from 10 mm to 15 mm, and a radius of the two curved wings of the second quarter wavelength conductor ranges from 10 mm to 15 mm.

5. The antenna assembly of claim 1 wherein a height of the flat portion of the first quarter wavelength conductor ranges from 70 mm to 85 mm, a height of the flat portion of the second quarter wavelength conductor ranges from 50 mm to 65 mm, a length of each of the two curved wings of the first quarter wavelength conductor range from 55 mm to 65 mm, and a length of each of the two curved wings of the second quarter wavelength conductor range from 35 mm to 45 mm.

6. The antenna assembly of claim 1 wherein each of the two curved wings of the first quarter wavelength conductor are located at an edge of the flat portion and have a radius ranging from 10 mm to 15 mm, and wherein each of the two curved wings of the second quarter wavelength conductor are located at an edge of the flat portion and have a radius ranging from 10 mm to 15 mm.

7. The antenna assembly of claim 1 wherein the flat portion of the first and second quarter wavelength conductors is made from FR4 PCB and the two curved wings of each of the first and second quarter wavelength conductors are composed of stainless steel.

8. The antenna assembly of claim 1 wherein the antenna assembly further comprises a coaxial connector with a center conductor connected onto the joined flat portions from both the first and second wavelength conductors.

9. An ultra-wideband monopole antenna assembly having a low and slim profile, the antenna assembly comprising:

a first quarter wavelength conductor comprising a first flat portion and two curved wings;

a second quarter wavelength conductor comprising a second flat portion and two curved wings;

wherein each of the first quarter wavelength conductor and the second quarter wavelength conductor is configured to transmit and/or receive an electromagnetic signal;

wherein the antenna assembly operates on a 5G band;

wherein the flat portion of the first quarter wavelength conductor and the flat portion of the second quarter wavelength conductor are arranged and located perpendicular and intersect each other;

wherein the two curved wings of the first quarter wavelength conductor and the two curved wings of the second quarter wavelength conductor are arranged and located concentrically and have a same center;

wherein a radius and distance from a center of the two curved wings of the first quarter wavelength conductor are different than a radius and distance from the center of the two curved wings of the second quarter wavelength conductor.

10. An ultra-wideband monopole antenna assembly having a low and slim profile, the antenna assembly comprising:

a first quarter wavelength conductor comprising a first flat portion and two curved wings;

a second quarter wavelength conductor comprising a second flat portion and two curved wings;

wherein each of the first quarter wavelength conductor and the second quarter wavelength conductor is configured to transmit and/or receive an electromagnetic signal;

wherein the antenna assembly operates on a 5G band;

wherein the flat portion of the first quarter wavelength conductor and the flat portion of the second quarter wavelength conductor are arranged and located perpendicular and intersect each other;

wherein the two curved wings of the first quarter wavelength conductor and the two curved wings of the second quarter wavelength conductor are arranged and located concentrically and have a same center;

wherein the two curved wings from the first quarter wavelength conductor each have a different height as connected onto the flat portion of the first quarter wavelength conductor and the ultra-wideband monopole antenna assembly has a height less 80 mm.

11. An ultra-wideband monopole antenna assembly having a low and slim profile, the antenna assembly comprising:

a first quarter wavelength conductor comprising a first flat portion and two curved wings;

a second quarter wavelength conductor comprising a second flat portion and two curved wings;

wherein each of the first quarter wavelength conductor and the second quarter wavelength conductor is configured to transmit and/or receive an electromagnetic signal;

wherein the antenna assembly operates on a 5G band;

wherein the flat portion of the first quarter wavelength conductor and the flat portion of the second quarter wavelength conductor are arranged and located perpendicular and intersect each other;

wherein the two curved wings of the first quarter wavelength conductor and the two curved wings of the second quarter wavelength conductor are arranged and located concentrically and have a same center;

wherein the two curved wings from the second quarter wavelength conductor each have a different height as connected onto the flat portion of the second quarter wavelength conductor, and the ultra-wideband monopole antenna assembly has a height less 80 mm.

* * * * *